(12) United States Patent
Noeth et al.

(10) Patent No.: US 6,918,315 B2
(45) Date of Patent: Jul. 19, 2005

(54) DISPLAY UNIT FOR A GEAR SELECTOR DEVICE

(75) Inventors: Thomas Noeth, Bad Neustadt (DE); Volker Gessner, Salz (DE); Ralf Weiss, Emmering (DE)

(73) Assignee: Preh-Werke GmbH & Co. KG, Bad Neustadt (DE)

(*) Notice: Subject to any disclaimer, the term of this patent is extended or adjusted under 35 U.S.C. 154(b) by 160 days.

(21) Appl. No.: 10/390,727

(22) Filed: Mar. 19, 2003

(65) Prior Publication Data

US 2003/0214492 A1 Nov. 20, 2003

(30) Foreign Application Priority Data

Mar. 19, 2002 (DE) .......................................... 102 11 968

(51) Int. Cl.$^7$ .............................................. F16H 59/00
(52) U.S. Cl. ...................................... 74/335; 200/61.88
(58) Field of Search .......................... 200/61.88, 61.91; 74/335, 473.12

(56) References Cited

U.S. PATENT DOCUMENTS 5,009,128 A    4/1991  Seidel et al.
6,046,673 A  * 4/2000  Michael et al. ............. 340/456

FOREIGN PATENT DOCUMENTS

| DE | 3832971  | A1 | 4/1990  |
| DE | 19714495 | A1 | 10/1998 |
| DE | 19849076 | A1 | 4/2000  |
| DE | 19903294 | A1 | 8/2000  |
| DE | 10108267 | A1 | 10/2001 |

* cited by examiner

Primary Examiner—Dirk Wright
(74) Attorney, Agent, or Firm—Birch, Stewart, Kolasch & Birch, LLP

(57) ABSTRACT

Increasing complexity brings with it the desire to combine the various display schemes necessary for the different automatic transmission variants in one display unit or one display module. To this end, provision is made to integrate the electronics for the display unit in the combined display scheme, wherein the electronics automatically detect which transmission is installed, preferably by a system cable harness of the motor vehicle, and hence which of the display schemes is needed in order to operate the appropriate light or display in accordance with the shift position. The unneeded display scheme or schemes remain in the deactivated state, and hence are not visible to the driver of the vehicle.

13 Claims, 3 Drawing Sheets

DISPLAY UNIT FOR A GEAR SELECTOR DEVICE

This nonprovisional application claims priority under 35 U.S.C. § 119(a) on German Patent Application No. 102 11 968.6 filed in Germany on Mar. 19, 2002, which is herein incorporated by reference.

BACKGROUND OF THE INVENTION

1. Field of the Invention

The present invention relates to a display unit for a gear selector device of an automatically shifted transmission.

2. Description of the Background Art

Known from DE 198 49 076 A1 is a selector device for selecting operating settings of an automatically shifted transmission of a motor vehicle. This selector device has an automatic gear device and stepwise shifting operation. A selector lever can be moved into the settings D, N and R, and the position of the selector lever can be displayed.

DE 199 03 294 A1 discloses a selector device for a motor vehicle with an automatically shifted transmission. This device has a first shift track for selecting various shift settings such as P, R, N and D, as well as another shift track for manual operation. The selector lever setting is also shown by a display scheme.

The setting of a selector lever is indicated by a display or display scheme, which has already been disclosed in DE 197 14 495 A1.

DE 101 08 267 A1 is concerned with a gear selector device for a transmission in a motor vehicle. The subject matter is diagnostics for the presence of certain electronic components necessary at least for shifting of the transmission or operation of the transmission control. Provision is made here for backlighting the selected gear selector position in the display scheme.

Increasing complexity brings with it the desire to combine the various display schemes necessary for the different automatic transmission variants in one display unit or one display module.

SUMMARY OF THE INVENTION

It is therefore an object of the present invention to provide a solution which ensures that the displays of the display scheme belonging to the installed transmission are made clearly visible.

The invention is based on the concept, building on the combination of multiple display schemes, of integrating the electronics for the display unit in the combined display scheme, wherein the electronics automatically detect which transmission is installed, preferably by means of a system cable harness of the motor vehicle, and hence which of the display schemes is needed in order to operate the appropriate light or display in accordance with the shift position. The unneeded display scheme or schemes remain in the deactivated state, and are not visible to the driver of the vehicle.

It is advantageous when warning symbols are preferably also included in this display unit to likewise activate and illuminate them as needed, wherein this too can be automatically accomplished by the electronics.

The display itself can be implemented in a variety of different ways, for instance by printing one or more windows with a black window technique, for example a PC foil or a plate, as well as using an LCD (Liquid Crystal Display) or OLED (organic Light Emitting Diode) display. The individual elements are then reproduced on the displays.

A display produced with OLED technology, in particular, is advantageous with regard to the visibility of the symbols (displays) shown, since such displays have good brightness and are largely independent of the viewing angle. A further advantage of OLED displays is that a partial dot matrix area can be integrated therein. In this way, any desired additional text and symbols can be displayed in this area.

The modular construction of the display unit makes possible a platform-independent design, for example as primary display in the vicinity of the gearshift or selector lever. Combining the various display schemes and warning symbols in one unit (module) provides a concentrated local display. As a result, it is possible to eliminate the now unnecessary separate displays that are otherwise located in other areas of the vehicle, for example in an instrument cluster and/or a center console. This can achieve clearer communication of information to the driver of the vehicle. A significant cost and space saving is also achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
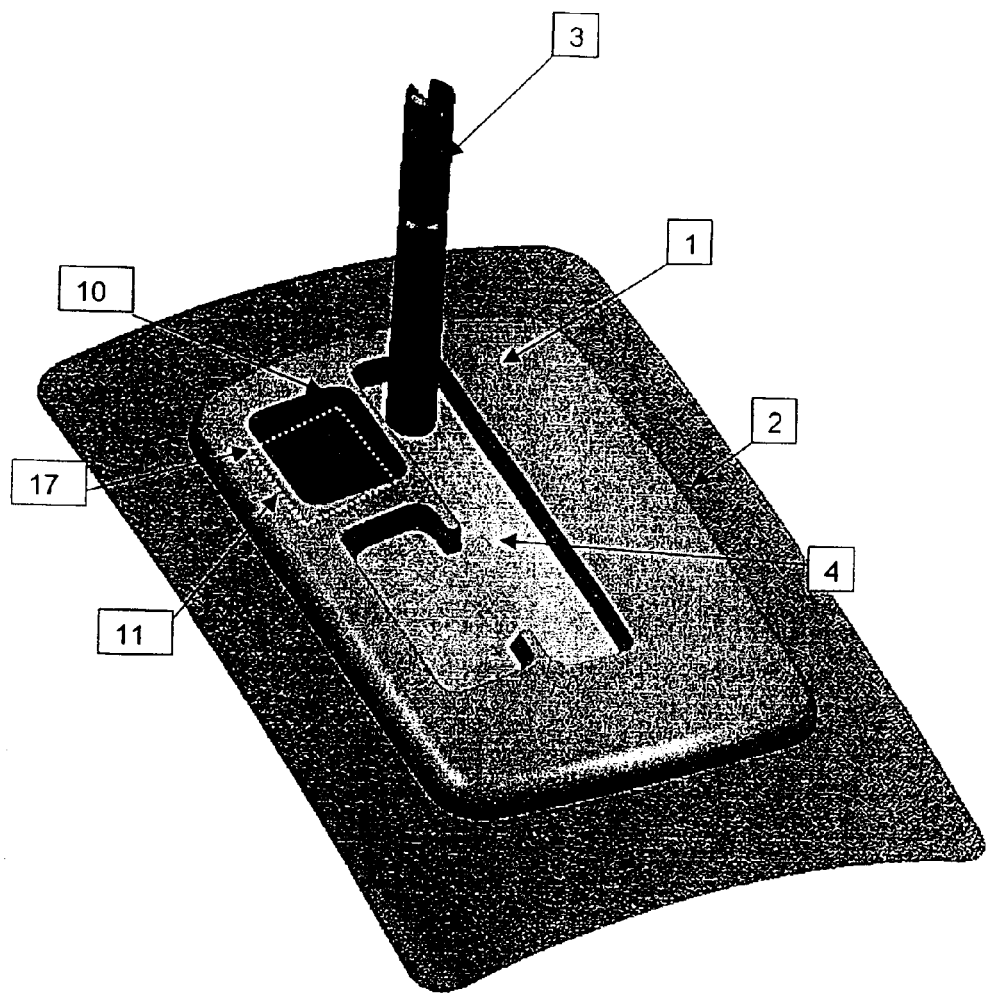
FIG. 1 is a partial representation of a gear selector apparatus with a combination display scheme in the vicinity of the gear selector apparatus.

Shown in FIG. 1 is a top view of a gear selector apparatus 1 of a motor vehicle (not shown), which is integrated in a center console 2. The selector lever 3 serves in a known way as a selector device for engaging the individual settings of the vehicle, and has electrical contacts or magnets at its lower end, not visible because of a cover 4, by which a signal is generated for a transmission processor of a transmission electronics unit that is transmitted to a transmission control unit as a control signal. Since these electronic assemblies themselves are not the subject of the invention, they are not shown in the drawings and are not described in detail.

Also integrated in the center console 2 is a display unit 10 for displaying a selector position of a selected gear selector setting. The display unit 10 has at least two distinct display schemes 12–15 that are different from one another, as is clearly shown in FIG. 2. The display schemes 12–13 and 14 each represent one transmission variant here. The scheme 15 can be combined with the other two schemes.

The display unit 10 has a control electronics system 11 that is connected to the individual display schemes 12–15 and is responsible for controlling the displays of the individual display schemes 12–15, which are not visible in FIG. 1. For this purpose, the control electronics system 11 is connected to the system cable harness, through which the control electronics system 11 receives the information as to which transmission variant is installed. The control unit 17 receives this information preferably from the transmission processor of the transmission electronics, from which the transmission type can be read. Therefrom, the control electronics system 11 determines the display scheme 12–15 in which the appropriate elements are activated in order to make these elements visible so that they stand out from the others.

Figure 2:
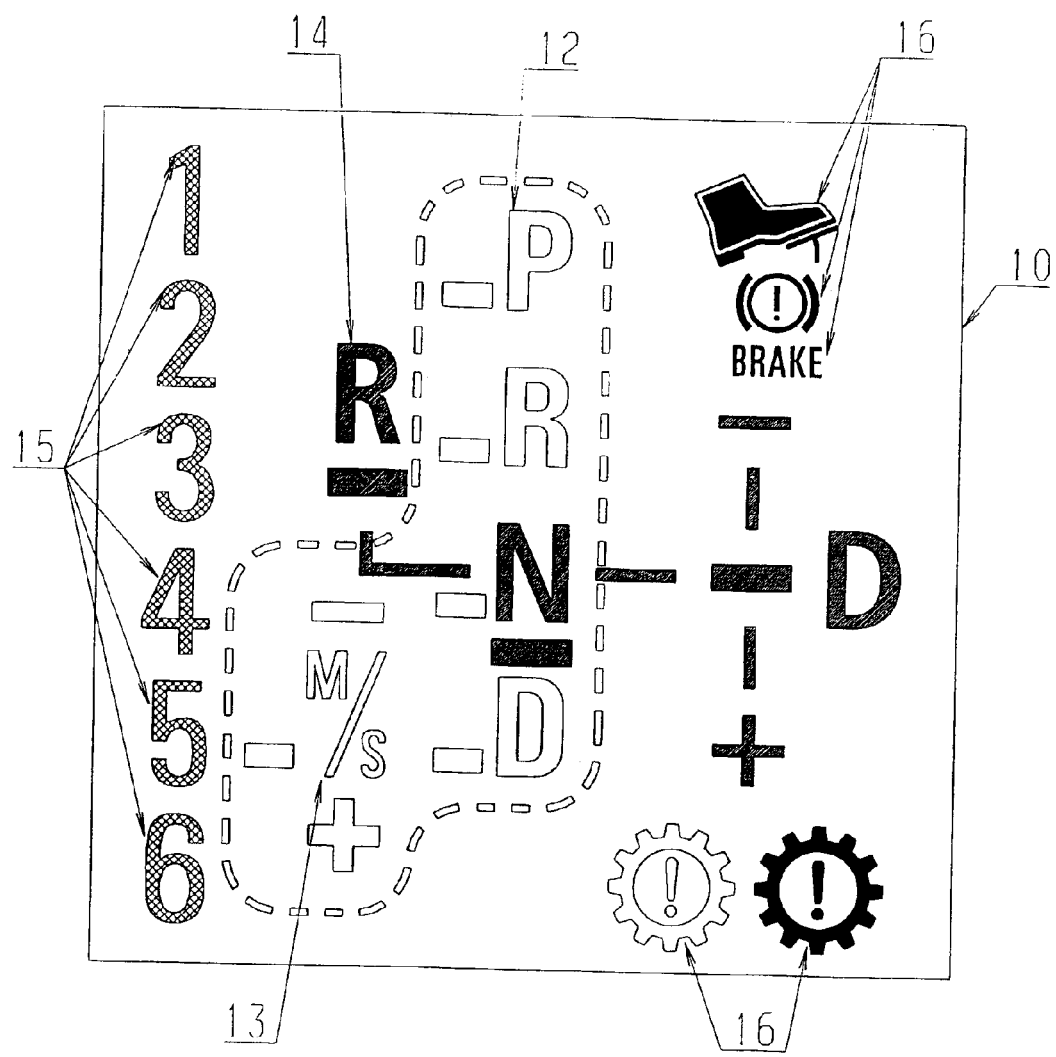
FIG. 2 is a top view of the display showing one variation of the many possible combinable display schemes.
Figure 3:
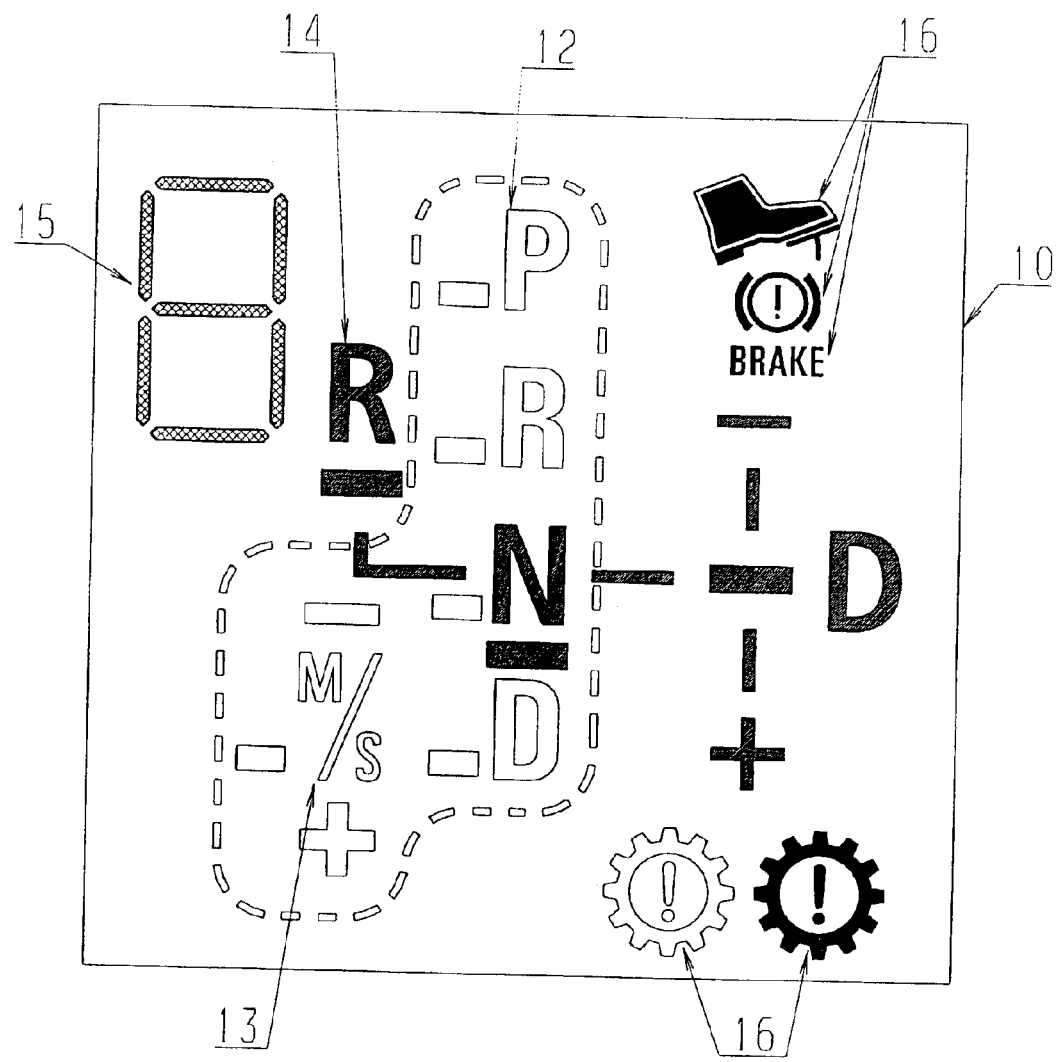
FIG. 3 is a top view of the display with the gear setting display using a multi-segment technique.

FIG. 2 shows the display unit 10, without the control electronics 11, in a top view enlarged as compared to FIG. 1. Here the display schemes 12 and 14 are preferably arranged so as to be interlinked with one another in a space-saving fashion.

If the transmission being used is an automatic transmission with the shift positions 1-2-3-4-5-6 (display scheme 15), the elements of this display scheme 15 are illuminated upon operation of the selector lever 1 when the specific setting or selector position has been engaged. One of the other two display schemes 12, 14 remains unilluminated (deactivated) for the vehicle driver, and is invisible to the driver in this state.

When an automatic transmission with the shift positions P-R-N-D (display scheme 12) is used, only the elements of the display scheme 12 are illuminated.

If the installed automatic transmission is the P-R-N-D variant with a manual shift track M/S (display scheme 13), then these elements are illuminated in addition to the display scheme 12.

Independently of the display schemes that are activated, warning symbols 16, which may be integrated in the display unit 10, can also be illuminated. Operation is preferably performed by the control electronics system 11. Frequently, however, the warning symbols 16 are independent of the transmission, so that special illumination control by the electronics system 11 is not absolutely necessary.

The illumination that make the displays 12–15 and the warning symbols 16 visible are not shown, since numerous variations are possible here.

In a preferred embodiment, the displays 12–15 and warning symbols 16 are shown printed as solid figures. In this way it is possible to achieve greater definition and brilliance of the displays 12–15 and warning symbols 16, which brings about significantly improved legibility thereof in all lighting conditions for the driver of the vehicle. In this context, LEDs, which backlight the displays 12–15 and warning symbols 16, are a possibility.

In the case of an OLED display, the displays 12–15 and warning symbols 16 are illuminated by the emission of the organic luminous substance when the individual display elements 12–15/warning symbols 16 in the display are activated. It is also possible to use a simple LCD display.

The display unit 10 can be enhanced with additional symbols or information. The inclusion of dot matrix areas is a possibility for doing so.

The display scheme 12 here represents an automatic transmission. The combination of display schemes 12 and 13 permits representation of an automatic transmission with a manual shift track. The display scheme 14 represents an example of a sequential transmission.

The display 15 serves to represent the engaged setting in manual mode of the automatic transmission as well as of the sequential transmission. The shift paths and symbols shown are to be viewed as examples, and can be changed to reflect the actually existing shift paths.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display unit for a gear selector device of an automatically shifted transmission with transmission electronics, having an electronics system at least for operating one of the gear selector positions of a selected gear selector setting,
   wherein a display scheme from a plurality of display schemes is displayed on the display unit on the basis of an installed transmission type and elements of the display scheme are operated by the electronics system, and
   wherein information pertaining to the installed transmission is supplied by a control unit that is functionally connected to the transmission electronics and is connected to the electronics system.

2. The display unit according to claim 1, wherein the control unit and electronics system can be combined into an electronics module.

3. The display unit according to claim 1, wherein the control unit is connected to a system cable harness.

4. The display unit according to claim 1, wherein the control unit is a microprocessor.

5. The display unit according to claim 1, wherein the unneeded display scheme remains in a deactivated state.

6. The display unit according to claim 1, wherein individual display elements are printed windows.

7. The display unit according to claim 1, wherein the display unit is composed of an LCD.

8. The display unit according to claim 1, wherein the display unit is an OLED.

9. The display unit according to claim 1, wherein warning symbols are part of the display unit and are operated by the electronics.

10. The display unit according to claim 1, wherein any desired additional text and symbols can be integrated into the display by dot matrix areas.

11. A display unit for a gear selector device, the display unit comprising:
    a display window for displaying a position of a gear selected by the gear selector device; and
    a control electronics system for receiving information pertaining to a type of transmission that the gear selector device is associated with,
    wherein, based on the type of transmission, the display window displays one of a plurality of display schemes that is associated with the type of transmission.

12. A display unit for a gear selector device, the display unit comprising:
    a display window for displaying a position of a gear selected by the gear selector device; and
    a control electronics system for determining a type of transmission that the gear selector device is associated with,
    wherein the display window displays one display scheme from a plurality of display schemes, determined by the control electronics to be associated with one of a plurality of transmission types.

13. A method for displaying a display scheme in a display window of a display unit for a gear selector device, the method steps comprising:

receiving information pertaining to a type of transmission that is associated with the gear selector device;

determining from a plurality of display schemes, the display scheme that is associated with the type of transmission; and displaying the display scheme that is associated with the type of transmission associated with the gear selector device, in the display window.

\* \* \* \* \*